United States Patent Office

3,226,289
Patented Dec. 28, 1965

3,226,289
METHOD AND COMPOSITIONS FOR CHEMO-
STERILIZATION OF INSECTS
Hilary F. Goonewardene, Moorestown, N.J., assignor, by mesne assignments, to Rohm & Haas Pharma G.m.b.H., Darmstadt, Germany, a German corporation
No Drawing. Filed Dec. 28, 1964, Ser. No. 421,691
7 Claims. (Cl. 167—22)

This invention relates to the use of certain synthetic organic compounds for the control or eradication of insect population by causing sexual sterility in the insect. More particularly, the present invention relates to certain N-alkyl derivatives of methyl substituted acrylamide which may be represented by the following general structural formula:

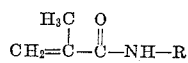

wherein R is selected from the group consisting of straight chain alkyl groups having 1 to 8 carbon atoms and branched chain alkyl groups having 1 to 8 carbon atoms.

Advantageous compounds are those above where R is a branched alkyl group having 1 to 5 carbon atoms.

Illustrative of such compounds are:

N-methyl-2-methylacrylamide.
N-ethyl-2-methylacrylamide.
N-propyl-2-methylacrylamide.
N-isopropyl-2-methylacrylamide.
N-butyl-2-methylacrylamide.
N-(sec-butyl)-2-methylacrylamide.
N-isobutyl-2-methylacrylamide.
N-(tert-butyl)-2-methylacrylamide.
N-amyl-2-methylacrylamide.
N-isoamyl-2-methylacrylamide.
N-(tert-amyl)-2-methylacrylamide.
N-hexyl-2-methylacrylamide.
N-isohexyl-2-methylacrylamide.
N-heptyl-2-methylacrylamide.
N-[2-(2,4,4-trimethylpentyl)]-2-methylacrylamide.

It has been proposed that the introduction of a sufficient number of sterile male or female inserts into an insect population will cause a reduction in that population. Reared or wild insects that have been rendered incapable of reproduction but still capable of mating can be used. Sterile insects mating with fertile ones will result in the females laying no eggs or only nonviable eggs, thus decreasing the prolific reproductive capacity of insect species.

The practicality of this approach to insect control was demonstrated in the eradication of the screw-worm fly on the island of Curacao, an dsubsequently in Florida and southeastern States. In this case, sexual sterility in the reared screw-worm flies was produced by irradiation with gamma rays of the insect in its pupal stage. Sufficient quantities of sterile flies were reared and released so that the initial ratio of sterile flies to wild flies was estimated to be between 2 and 4 to 1. This procedure caused eradication of the fly in three months or in about three generations.

For best results, it would be most desirable to reduce the wild population to a low level. Concurrent use of the usual persistant-type insecticides would not be suitable for this purpose since it would undoubtedly destroy the sterile insects in the same ratio as the wild ones. Mass sterilization of insects in nature by high-energy irradiation is not practical, but adequate sterilization can be readily accomplished through the offering of a chemical at bait stations or by other means. This will eliminate resort to hazardous and expensive ionizing radiation to induce sterility in insects.

Therefore, an object of this invention is to provide a material that can be used to achieve control of an insect population by chemical sexual sterilization of the wild insect.

Another object of this invention is to provide a cheap material which will cause sexual sterility when fed or applied to reared insects.

Still another object of the invention is to minimize the indiscriminate contamination of the environment, food and water sources of man and animal through the traditional use of potent toxicants.

Yet another object of this invention is to provide a chemical having the specificity toward particular economic pests leaving less troublesome species uneffected.

The methods of synthesis of the aforesaid commercial pesticides is generally known and does not form a part of the present disclosure. Numerous references in the chemical literature teach practical means for the synthesis of these compounds, e.g., Plaut et al., Journal of the American Chemical Society, 73:4076 (1951) disclosing general synthetic pathways for the synthesis of N-alkyl methacrylamides from the reaction of methacrylonitrile with alcohols and olefins, specifically including certain of the preferred chemosterilants of this invention.

In any event, chemists skilled in the art of organic synthesis can readily establish practical methods of manufacture. In most instances, chemosterilant formulators and/or users can purchase readily in the open market acrylamides which may be employed in accordance with the teachings of this invention.

*Chemosterilant screening method*

A solution containing 200 p.p.m. of the candidate chemical is made up in the appropriate solvent. The solution is then thoroughly mixed with non-fat dry milk powder (50%) in a dish and the resulting mixture is allowed to evaporate to dryness.

Water is used to dilute each dish of fly food as suggested by the manufacturers of the dry milk powder. The dishes are then introduced into cages containing approximately 50 to 100 freshly emerged house flies of both sexes (*Musca domestica* L.). The flies are allowed to feed for five days prior to oviposition (insect egg laying). No other food is available during this period of feeding. Test chemical fed flies are paired and single pairs are introduced into individual oviposition cages containing an oviposition substrate of 50 g. of Gaines Dog Meal, moistened with a 50 ml. (8 g. of dry yeast/liter of water) yeast suspension. The pairs of flies on isolation are supplied with non-treated food (water diluted dry milk powder).

The control oviposition cages are stocked with pairs of flies of the same age and reared on non-chemical treated food. The oviposition medium from each cage is renewed each 24-hour period. The number of eggs laid in the oviposition medium during each period is recorded.

The average oviposition period lasts about 6 days.

The results of employing this screen with N-t-butyl-2-methylacrylamide, SK & F No. 22359, are shown in tabular form in the following table.

TABLE

| Dosage | Total number of eggs laid per female within oviposition period | |
|---|---|---|
| | Controls, avg. of 2 replicates | Treated with SK & F #22,359 |
| 200 p.p.m. of chemical per day for 5-day preoviposition feeding period. | 92<br>53<br>43<br>56<br>26<br>81<br>55<br>68<br>54<br>71<br>100<br>73<br>106<br>122<br>74 | 36<br>8<br>0<br>0<br>0<br>0<br>0<br>0<br>0<br>0<br>0<br>0<br>0<br>0<br>0 |
| Totals (15 females) | 1,074 | 44 |
| Average per female | 71.6 | 2.9 |

It can be seen from the preceding data that the candidate chemosterilant in 13 insects gives outstanding results, i.e., complete sterility in 13 insects, as compared to the 15 control. The fair results with two flies is probably accountable for by the uncontrollable variation in feeding habits. The net effectiveness for the entire sampling is quite striking.

The foregoing example in which the reproductive capacity of the female insects was grossly depressed or eliminated by feeding a chemical are illustrative rather than limiting. For example, in regard to mode of administration other routes of administration of the chemical well known in the art of insect control, such as topical, contact, dipping, injection, may be employed as convenient to the particular situation and insect. The disclosure is also not meant to limit the action of the chemical sterilants to one particular stage of the insect growth cycle. It is known that insects are more responsive to chemicals during some stages of growth than others, e.g., the pupal (post larval) stage.

The active compositions of this invention are produced by admixing the compounds of this invention with a suitable diluent, which is an inert material, to facilitate the mechanical distribution of the sterilant. Such inert materials could be added for the purposes outlined in Frear, "Chemistry of Insecticides, Fungicides, and Herbicides," second edition (1948), page 5, to form baits, sprays, dusts, and aerosols from the adducts. Surface-active dispersing agents are used in admixture with the compounds to promote the spreading of the active material and thereby improve its effectiveness through assuring contact between organisms and sterilant. They are used in both aqueous and dry formulations.

In general, compositions containing from about 0.001% to 10% of active ingredient or 0.1 p.p.m. to 100,000 p.p.m. of the active ingredient in either a liquid or solid carrier give excellent results from use in this concentration range. The recited upper limit may be employed in non-agricultural applications. A preferred range for optimum biological effectiveness is from 0.01% to 5% of active ingredients, e.g., 1 p.p.m. to 50,000 p.p.m.

Liquid carriers which may be employed include water, mineral oils, and organic solvents, as well as other solvents, including wetting and suspending agents. Solid carriers which may be employed are talc; bentonite; attapulgite; diatomaceous earth, silica; pyrophyllite; fuller's earth; lime; gypsum; and flour derived from cotton seeds, walnut shells, corn cobs, or other similar powders, and resins, polymers, paper and other vehicles for impregnation.

The composition may also contain additives such as wetting agents, binding agents, gases compressed to the liquid stage, odorants, stabilizers, and the like. The compositions can be applied as dispensing liquid sprays or gas-propelled sprays. Advantageously, as described in the example, an insect nutrient such as dry milk powder may be incorporated to induce ingestion of the active chemical.

The compounds of the present invention may be used as a formulation, e.g., wettable powder, dust, emulsion concentrate, dust concentrate, spray, impregnated strip or bait, or as the pure or technical grade active ingredient.

Various modifications and alterations of this invention will become apparent to those skilled in the art without departing from the scope and spirit of the invention, and it should be understood that the latter is not necessarily limited to the aforementioned disclosure.

What is claimed is:

1. A method of causing sexual sterility in female insects which comprises treating the insect with an effective amount of an N-alkyl-2-methylacrylamide compound having the following general structural formula:

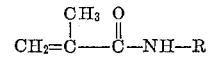

wherein R is selected from the group consisting of straight chain groups having 1 to 8 carbon atoms and branched chain alkyl groups having 1 to 8 carbon atoms.

2. A method of causing sexual sterility of any insect whose control can be obtained by chemosterilization which comprises treating the insect with an effective amount of an N-alkyl-2-methylacrylamide compound having the following general structural formula:

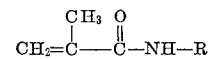

wherein R is selected from the group consisting of straight chain groups having 1 to 8 carbon atoms and branched chain alkyl groups having 1 to 8 carbon atoms.

3. A method of causing sexual sterility of any insect whose control can be obtained by chemosterilization which comprises treating the insect with an effective amount of N-(tert-butyl)-2-methylacrylamide.

4. The method of claim 1 wherein said compound is N-(tert-butyl)-2-methylacrylamide.

5. The method of claim 1 wherein said insect is the house fly.

6. An insect chemosterilant composition comprising:
(a) an N-alkyl-2-methylacrylamide compound having the following general structural formula:

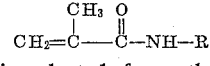

wherein R is selected from the group consisting of straight chain groups having 1 to 8 carbon atoms and branched chain alkyl groups having 1 to 8 carbon atoms,
(b) an insect nutrient, and
(c) an inert carrier therefor.

7. An insect chemosterilant composition comprising:
(a) N-(tert-butyl)-2-methylacrylamide,
(b) an insect nutrient, and
(c) an inert carrier therefor.

No references cited.

JULIAN S. LEVITT, *Primary Examiner.*